United States Patent
Wang

[11] Patent Number: 6,059,410
[45] Date of Patent: May 9, 2000

[54] EYEGLASSES ELASTIC TEMPLE

[76] Inventor: Chi-Jen Wang, 40, Chung Lun, Chung Sha Village, An-Ding, Tainan County, Taiwan

[21] Appl. No.: 09/370,475

[22] Filed: Aug. 9, 1999

[51] Int. Cl.[7] .................................................. G02C 5/14
[52] U.S. Cl. ............................................. 351/112; 351/111
[58] Field of Search .................................. 351/112, 111, 351/114, 113, 41, 158

[56] References Cited

U.S. PATENT DOCUMENTS

| | | | |
|---|---|---|---|
| 2,097,371 | 10/1937 | Hon | 351/112 |
| 3,210,814 | 10/1965 | Wolf | 351/112 |

*Primary Examiner*—Hung Xuan Dang
*Attorney, Agent, or Firm*—Alan Kamrath; Oppenheimer Wolff & Donnelly LLP

[57] ABSTRACT

An eyeglasses elastic temple has a first lengthwise hole and a second lengthwise hole in a front portion, a connector connected respectively between one of two ends of a frame of the eyeglasses having a rear portion fitting in the first lengthwise hole and female threads in the rear portion. A spring and a connect rod having front male threads extend in the spring put in the first lengthwise hole, and a clamp bar has its front end fitting tightly in the second hole to keep the connect rod and the spring in place, with the male threads engaging the female threads. Then the temple can be collapsed to bend inward when the eyeglasses is not used, with the clamp bar clamping on a pocket of clothes to prevent the eyeglasses from falling off.

2 Claims, 2 Drawing Sheets

EYEGLASSES ELASTIC TEMPLE

BACKGROUND OF THE INVENTION

This invention relates to an eyeglasses elastic temple, particularly to one having an elastic clamp bar attached to a front portion of the temple, with the clamp bar hung a pocket of clothes when the eyeglasses is not used with the temples collapsed.

Conventional eyeglasses temples are mostly have proper elasticity to expand outward to suit to different width of the face of a user. But very few eyeglasses temples are provided with a clamp bar to be hung on a pocked of a clothing.

SUMMARY OF THE INVENTION

One objective of the invention is to offer an eyeglasses elastic temple having a first lengthwise hole and a second lengthwise hole behind the first lengthwise hole, a connector connecting the two sides of the frame of the eyeglasses and having a rear portion provided with female threads fitted in the first hole of the temple. A connect rod with front male threads passes through a spring placed in the first hole to engage the female threads to combine the temple with the connector. And a clamp bar is provided to have its front section fitting in said second hole and can be hung on a pocket of clothes to prevent the eyeglasses from falling off, when the temple is collapsed inward in case of the eyeglasses not used.

Another objective of the invention is to offer an eyeglasses elastic temple has a decorative chain attached to the second hole instead of the spring, the connect rod and the clamp bar for hanging the eyeglasses on the breast of a user.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
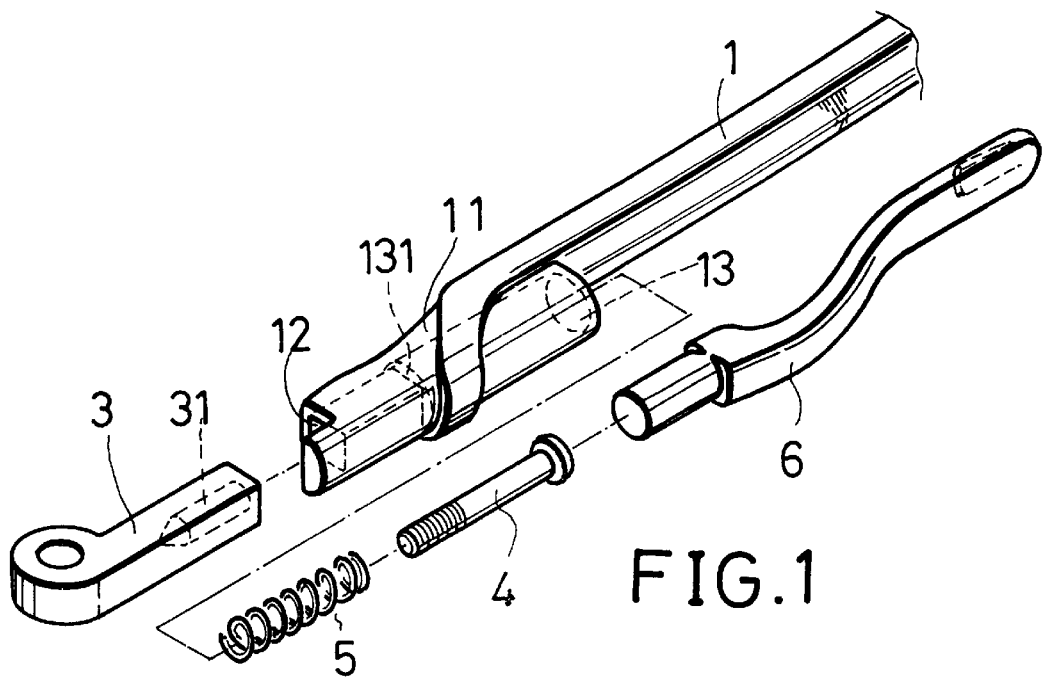
FIG. 1 is an exploded perspective view of an eyeglasses elastic temple in the present invention.
Figure 2:
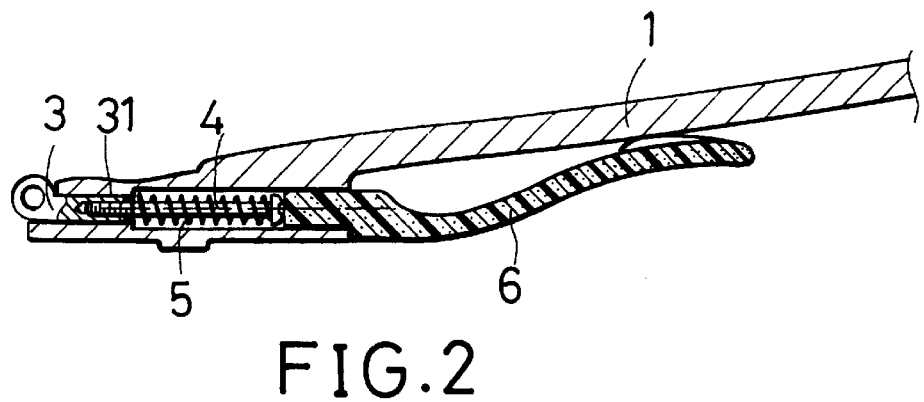
FIG. 2 is an upper view of the eyeglasses elastic temple in the present invention.
Figure 4:
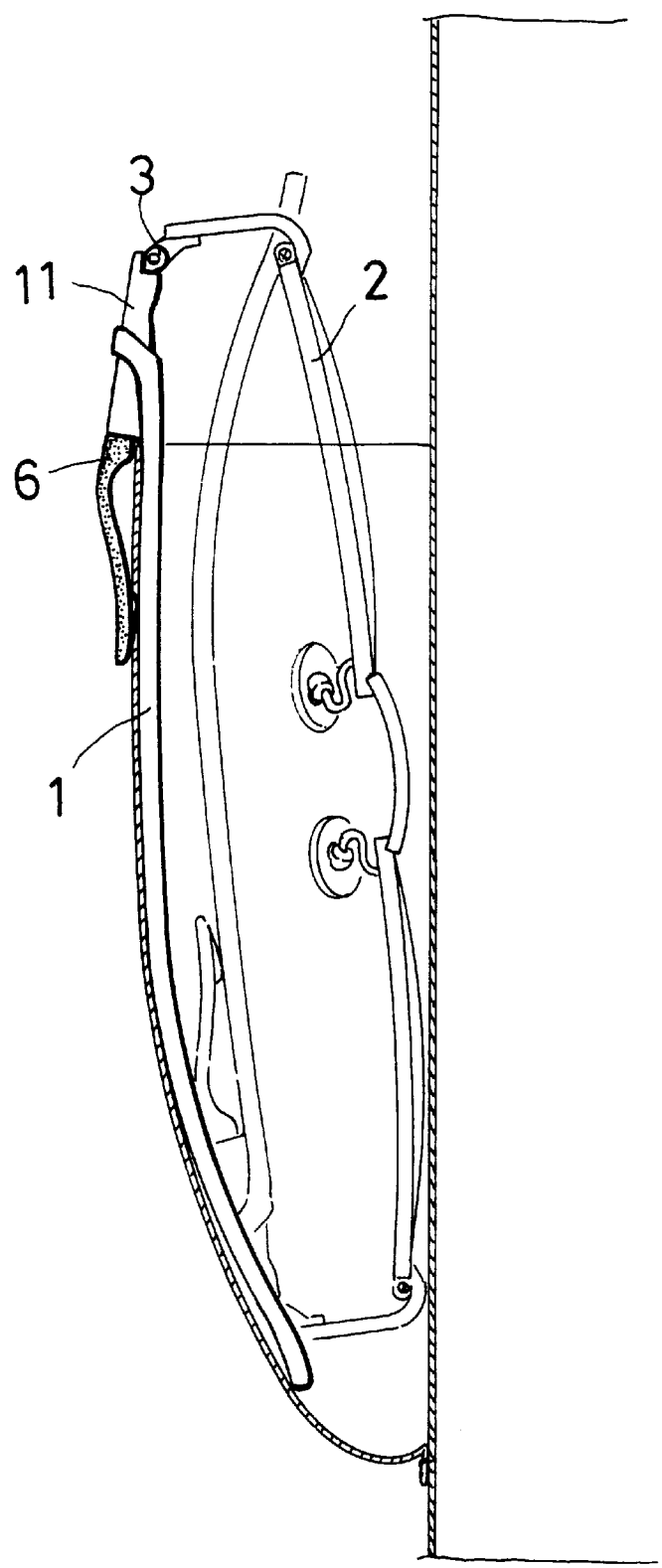

A preferred embodiment of an eyeglasses elastic temple in the present invention, as shown in FIGS. 1 and 4, includes a temple 1, a connector 3, a connect rod 4, a coil spring 5 and a clamp bar 6 connected to the connector 3, which is then connected respectively to two sides of the frame 2 of a pair of eyeglasses.

The temple 1 has a front end portion 11, a first lengthwise hole 12 of a square cross-section and a second lengthwise hole 13 of a round cross-section behind the first hole 11 formed in the front end portion 11. The first lengthwise hole 12 is for a rear end of a connector 3 to fit therein.

The connector 3 is connected respectively between two sides of the frame 2, and female thr eads 31 are formed in a rear end portion of the connector 3.

The connect rod 4 has a rear head and front male threads and passes through the coil spring 5 to protrude out of the first hole 12 to engage the female threads 31 to combine the temple 1 with the connector 3.

The coil spring 5 is located in the first lengthwise hole 12 of the temple 1, with its rear end resting on a separating wall 131 of the first and the second hole 12 and 13.

The clamp bar 6 has a front threaded portion 41 to fit firmly in the second lengthwise hole 13 of the temple 1.

Figure 3:
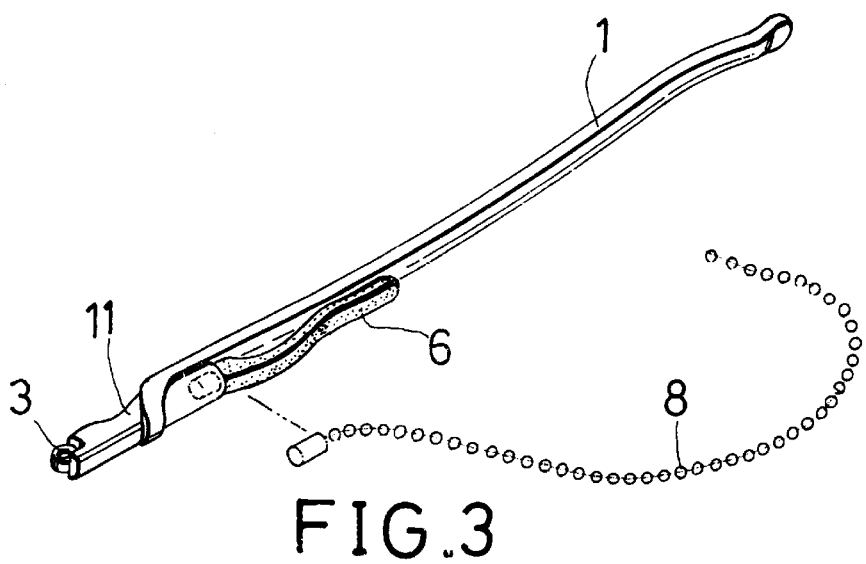
FIG. 3 is a perspective view of the eyeglasses elastic temple in the present invention; and, FIG. 4 is a side view of the eyeglasses with the elastic temples hung on a pocket in the present invention.

FIG. 3 shows the eyeglasses elastic temple in the invention, after it is assembled together. Then the temples 1 may have a proper elasticity to expand outward to be worn comfortably by a user on two ears, and the clamp bar 6 is useful to be hung on a pocket of clothes 7 after the temple 1 is collapsed inward when the eyeglasses are not to be worn.

Further, a decorative chain 8 can be used instead of the clamp bar 6 and attached with the rear end of the second hole 13, as shown in FIG. 3. Then the chain 8 may hung on the breast of a user as a common adornment to keep the eyeglasses when they are not to be worn.

The eyeglasses elastic temple in the invention has the following advantages.

1. It has a simple structure with a few components, convenient to manufacture and store its components.

2. It can be folded on the frame of the eyeglasses and be hung on a pocket of clothes, without randomly falling off.

3. The clamp bar can used to hung the eyeglasses on a pocket of clothes, and the second hole of the temple is useful for the clamp bar to fit tightly in or a decorative chain to be connected to instead of the clamp bar.

While the preferred embodiment of the invention has been described above, it will be recognized and understood that various modifications may be made therein and the appended claims are intended to cover all such modifications which may fall within the spirit and scope of the invention.

What is claimed is:

1. An eyeglasses elastic temple comprising:

a temple body provided with a front pivotal end portion having a first hole of square cross-section and a second hole of a round cross-section;

a connector having female threads formed in a rear end portion, connected respectively between two ends of a frame of eyeglasses;

a coil spring fitted in said first hole of said temple body and having its rear end resting on a separating wall of said first and said second hole;

a connect rod having a front male threaded portion and a rear head and passing through said coil spring forward and extending out of said first hole, with said male threaded portion engaging said female threads of said connector;

a clamp bar having a front round section to fit tightly in said second hole of said temple body, and contacting said head of said connect rod, and a rear end elastically resting on said temple body;

said temple having proper elasticity to expand outward when it is worn on a face of a user, and said clamp bar useful to hung on clothes when said temple is collapsed inward in case of said eyeglasses not used.

2. The eyeglasses elastic temple as claimed in claim 1, wherein a decorative chain is connected firmly with said second hole instead of said clamp bar.

* * * * *